(12) United States Patent
Knadler, IV et al.

(10) Patent No.: US 7,773,397 B2
(45) Date of Patent: Aug. 10, 2010

(54) METHOD AND SYSTEM OF CONTROLLING A POWER INVERTER

(75) Inventors: John M. Knadler, IV, Round Rock, TX (US); Eugen Munteanu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 11/771,296

(22) Filed: Jun. 29, 2007

(65) Prior Publication Data

US 2009/0003023 A1 Jan. 1, 2009

(51) Int. Cl.
*H02M 5/42* (2006.01)
*H02M 7/68* (2006.01)
*H02M 3/24* (2006.01)
*H02M 7/44* (2006.01)

(52) U.S. Cl. .......................................................... 363/98
(58) Field of Classification Search .................... 363/98, 363/97, 95
See application file for complete search history.

(56) References Cited

U.S. PATENT DOCUMENTS

| | | | | |
|---|---|---|---|---|
| 5,854,617 | A * | 12/1998 | Lee et al. | 345/102 |
| 6,947,024 | B2 * | 9/2005 | Lee et al. | 345/102 |
| 7,098,631 | B2 | 8/2006 | Cohen | 232/222 |
| 7,200,012 | B1 * | 4/2007 | Hsu | 363/17 |
| 2004/0145584 | A1 * | 7/2004 | Lee et al. | 345/212 |
| 2006/0018132 | A1 * | 1/2006 | Price et al. | 363/17 |
| 2007/0047276 | A1 * | 3/2007 | Lin et al. | 363/98 |
| 2007/0253226 | A1 * | 11/2007 | Fukumoto | 363/16 |

FOREIGN PATENT DOCUMENTS

JP  06233546 A  *  8/1994

\* cited by examiner

*Primary Examiner*—Bao Q Vu
*Assistant Examiner*—Jue Zhang
(74) *Attorney, Agent, or Firm*—Baker Botts L.L.P.

(57) ABSTRACT

Methods and systems for controlling a power inverter are provided. In accordance with one embodiment, a system for converting a direct current into an alternating current may include a switching module, a sensing module, and a control module. The switching module may have an input and an output, and may be operable to receive a direct current at the input and to generate at the output a corresponding alternating current with a desired output characteristic. The sensing module may be coupled to the switching module output, and may be operable to sense a power factor associated with a load coupled to the switching module output. The control module may be coupled to the power inverter and the sensing module, and may be operable to control the desired output characteristic based at least on the sensed power factor.

8 Claims, 3 Drawing Sheets

METHOD AND SYSTEM OF CONTROLLING A POWER INVERTER

TECHNICAL FIELD

The present disclosure relates in general to direct current to analog current power inverters, and more particularly to a method and system of controlling a power inverter.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a portable computer, also known as a "laptop" and/or "notebook" computer. Portable computers often contain components that are similar to their desktop counterparts and perform the same functions, but are miniaturized and optimized for mobile use and efficient power consumption. For example, portable computers may have liquid crystal displays (LCDs), built-in keyboards, and may utilize a touchpad (also known as a trackpad) or a pointing stick for input, although an external keyboard or mouse may be attached. In addition, portable computers may run on a single main battery or from an external analog current/direct current (AC/DC) adapter that can charge the battery while also supplying power to the computer itself.

As mentioned above, portable computers may utilize LCDs to display data and/or other media. LCDs are often a thin, flat display device made up of any number of color or monochrome pixels arrayed in front of a light source or reflector. Many LCDs also use very small amounts of electric power relative to other types of displays with similar viewable areas. Accordingly, because of their size and power consumption properties, LCDs are often used in battery-powered electronic devices, such as portable computers, for example.

LCDs used in information handling systems may comprise cold cathode fluorescent lamps (CCFLs) that provide display backlighting. In many applications, CCFLs are powered using alternating current (AC) power sources. Accordingly, when a CCFL is used in a portable computer system, the direct current (DC) power source that may power many components of a portable computer may be converted into alternating current sources by use of a power inverter in order to drive the CCFL.

LCDs may be available in a variety of different sizes. Generally, each differently-sized LCD requires a CCFL appropriately sized to effectively backlight the particular LCD. The electrical characteristics of CCFLs, including resistance, capacitance, and inductance, may vary in proportion to bulb size. Electrical characteristics of CCFLs may also vary from manufacturer to manufacturer. Because minimal power consumption is often desired in portable computers (as well as other applications), different power inverters must often be developed and tuned to effectively and efficiently drive each CCFL based on its electrical characteristics. Consequently, design of power inverters for use in connection with LCDs may involve configuration complexity and expense.

SUMMARY

In accordance with the teachings of the present disclosure, disadvantages and problems associated with conventional power inverters may be substantially reduced or eliminated. For example, the systems and methods disclosed herein may be technically advantageous because they may provide for a "universal" power inverter that may be adapted for a plurality of loads. In a particular embodiment, a system may include a sensing module coupled to the output of a power inverter, the sensing module operable to sense a power factor associated with an alternating current, and a control module operable to control the alternating current based at least on the sensed power factor.

In accordance with one embodiment of the present disclosure, a method for controlling a power inverter is provided. The method may include sensing a power factor of a load coupled to an output of the power inverter. The method may further include determining a desired output characteristic for an alternating current to be generated by the power inverter based on at least the sensed power factor. The method may also include generating the alternating current comprising the desired output characteristic at the output of the power inverter.

In accordance with another embodiment of the present disclosure, a system for converting a direct current into an alternating current may include a switching module, a sensing module, and a control module. The switching module may have an input and an output, and may be operable to receive a direct current at the input and to generate a corresponding alternating current at the output with a desired output characteristic. The sensing module may be coupled to the switching module output, and may be operable to sense a power factor associated with a load coupled to the switching module output. The control module may be coupled to the power inverter and the sensing module, and may be operable to control the desired output characteristic based at least on the sensed power factor.

In accordance with a further embodiment of the present disclosure, an information handling system may include a processor, a memory communicatively coupled to the processor, a display device coupled to the processor, and a power inverter. The display device may include an illumination device that provides illumination for the display device. The power inverter may be coupled to the illumination device, and operable to provide an alternating current to the illumination device. An output characteristic of the alternating current may be based on at least on a power factor associated with the illumination device.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
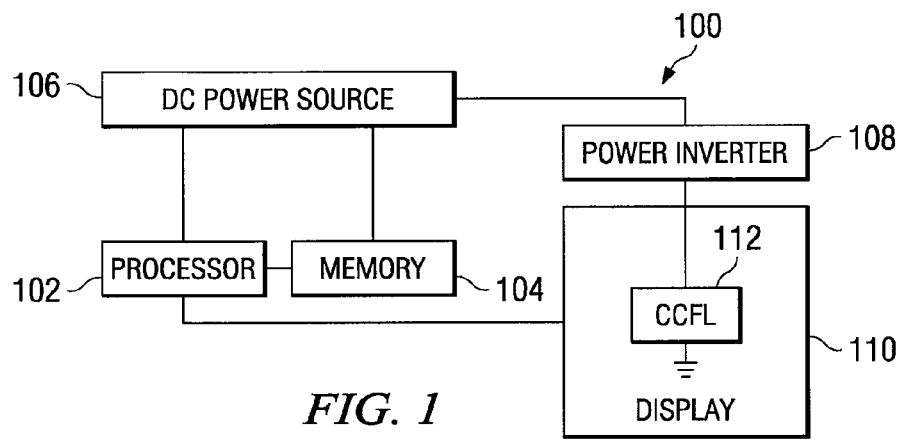
FIG. 1 illustrates a block diagram of an example information handling system, in accordance with teachings of the present disclosure.

FIG. 1 illustrates a block diagram of an example information handling system 100, in accordance with teachings of the present disclosure. As shown in FIG. 1, information handling system 100 may include a processor 102, memory 104, a direct current (DC) power source 106, a power inverter 108, and a display 110. Processor 102 may comprise any system, device or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of information handling system 100.

Memory 104 may be coupled to processor 102 and may comprise any system, device or apparatus operable to retain program instructions or data for a period of time. Memory 104 may be random access memory (RAM), electrically erasable programmable read-only memory (EEPROM), a PCM-CIA card, flash memory, or any suitable selection and/or array of volatile or non-volatile memory that retains data after power to information handling system 100 is turned off.

DC power source 106 may comprise any system, device or apparatus operable to supply DC electrical power to one or more components of information handling system 100. In some embodiments, DC power source 106 may comprise a battery. In the same or alternative embodiments, DC power source 106 may be an AC/DC adapter that may convert 120- or 240-volt (or any other suitable voltage) alternating current supplied by a utility company to a regulated lower voltage DC power source. In the same or alternative embodiments, an AC/DC adapter may also charge a battery while supplying power to information handling system 100.

Display 110 may comprise any display device suitable for creating graphic images and alphanumeric characters recognizable to a user, and may include, for example, a liquid crystal display (LCD) or a cathode ray tube (CRT). For example, in some embodiments, display 110 may include an illumination device 112, e.g., a cold cathode florescent lamp (CCFL), or any other suitable device for providing illumination for a display. In the embodiment depicted in FIG. 1, display 110 comprises an LCD including a CCFL 112. In operation, CCFL 112 may provide illumination or "backlighting" for display 110.

Power inverter 108 may comprise any suitable system, device or apparatus operable to convert DC to AC. In information handling system 100, power inverter 108 may convert direct current supplied from DC power source 106 into alternating current to be delivered to CCFL 112. In certain embodiments, power inverter 108 may be configured to deliver an alternating current to CCFL 112, the alternating current having one or more characteristics determined based at least on the electrical characteristics of CCFL 112, as discussed in greater detail below.

For the sake of simplicity, FIG. 1 depicts information handling system 100 comprising particular components. However, it is understood that information handling system 100 may comprise any number and/or type of suitable components, including without limitation, one or more storage resources, one or more network ports for communicating with external devices, as well as various input and output (I/O) devices, such as a keyboard, a mouse, and a video display. Information handling system 100 may also include one or more buses operable to transmit communications between the various hardware components.

As used herein, the term "storage resources" may include direct access storage (e.g., disk drives), sequential access storage (e.g., tape drives), and or other suitable computer-readable media (e.g., CD-ROM, CD-RW, DVD, floppy disks, other optical storage media, and/or other magnetic storage media). As used herein, the term "computer-readable medium" may include any system, device or apparatus operable to retain program instructions or data for a period of time, including without limitation, the storage resources identified in this paragraph, random access memory (RAM), electrically erasable programmable read-only memory (EEPROM), a PCMCIA card, flash memory, or any suitable selection and/or array of volatile or non-volatile memory.

Figure 2:
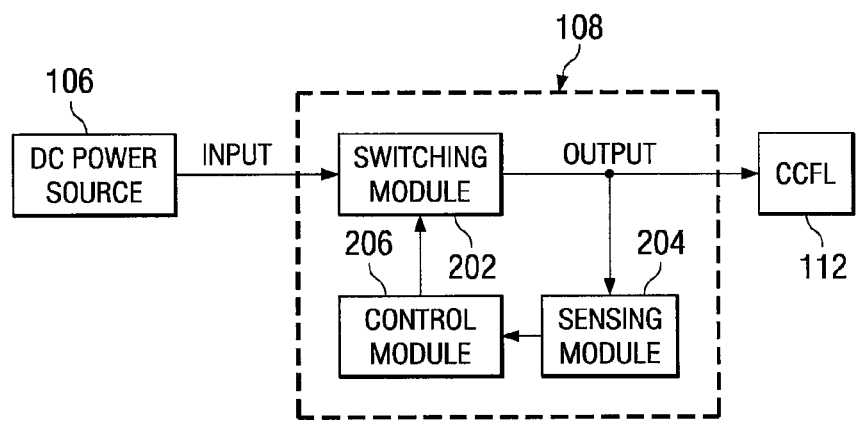
FIG. 2 illustrates a block diagram of an example power inverter, in accordance with teachings of the present disclosure.

FIG. 2 illustrates a block diagram of an example power inverter 108. Power inverter 108 may include a switching module 202, a sensing module 204, and a control module 206.

Switching module 202 may have an input and an output, which, in some embodiments, correspond to an input and an output, respectively, of power inverter 108. As depicted in FIG. 2, the input of switching module 202 may be coupled to DC power source 106 of information handling system 100, and the output of switching module 202 may be coupled to CCFL 112 of information handling system 100. Generally speaking, switching module 202 may be operable to receive a direct current at its input from DC power source 106 and generate a corresponding alternating current at its output to be delivered to CCFL 112. Switching module 202 may, in some embodiments, comprise a full bridge inverter 300 as depicted in FIG. 3 and discussed in greater detail below.

Sensing module 204 may be coupled to the output of switching module 202 and may generally be any system, device or apparatus operable to sense a power factor associated with the alternating current, e.g., as shown in U.S. Pat. No. 7,098,631 entitled "Method and Control Circuit for Power Factor Correction." As used in the electrical arts, the power factor of an AC electric power system is defined as the ratio of the real power to the apparent power, expressed as a value between 0 and 1. To illustrate, AC power flow has the three components: real power (P) measured in watts (W); apparent power (S) measured in volt-amperes (VA); and reactive power (Q) measured in reactive volt-amperes ($VA_r$). In the case of a perfectly sinusoidal waveform, P, Q, and S can be expressed as vectors that form a vector triangle such that:

$$S^2 = P^2 + Q^2$$

In addition, the power factor is defined as P/S.

Accordingly, by definition, the power factor is a dimensionless number between 0 and 1. In a purely resistive circuit (e.g., an electrical circuit comprising only resistive elements), the power factor equals 1, and voltage and current waveforms are in step (or in phase), changing polarity at the same instant in each cycle. Where reactive loads are present, for example as with capacitive or inductive elements, energy storage in the loads may cause a phase difference between the current and voltage waveforms. This stored energy returns to the source and is not available to do work at the load. A circuit with a low power factor will thus have higher currents to transfer at a given quantity of power than a circuit with a high power factor. When the energy flow is entirely reactive, the power factor is equal to 0, and stored energy in the load returns to the source on each cycle, thus performing no work at the load.

Consequently, the power factor of a load coupled to the output of switching module 202 may be indicative of the inductance and/or capacitance present in a load coupled to the output. In many applications, CCFLs, (e.g., CCFL 112) are significantly capacitive, and the capacitance of CCFLs may increase or decrease substantially in direct proportion to the size of the CCFLs. As previously mentioned, capacitance of a CCFL may also vary depending on its manufacturer. Therefore, a power factor of a load including CCFL 112 may be indicative of the capacitance of CCFL 112. Often, the amount of power necessary to effectively drive a CCFL is substantially proportional to the capacitance of the load including the CCFL. Thus, by sensing a power factor of a load including CCFL 112, sensing module 204 may be able to determine the capacitance of the load and the amount of power necessary to drive the load.

Control module 206 may be coupled to each of sensing module 204 and switching module 202. In general, control module 206 may be any system, device or apparatus operable to control the switching of elements comprising switching module 202, e.g., a MAX8759 integrated CCFL inverter controller manufactured by Maxim Integrated Products, Inc. or similar device. In operation, the power factor sensed by sensing module 204 may be communicated to control module 206. Based at least on the sensed power factor, control module 206 may be operable to control a desired output characteristic of an alternating current generated by switching module 202. For example, if a low power factor is sensed by sensing module 204, possibly indicating a relatively large capacitance for a load including CCFL 112, control module 206 may cause switching module 202 to generate an alternating current with one or more desired output characteristics suitable to drive the load. For example, in one embodiment, the desired output characteristic may comprise an amplitude of a voltage of the alternating current generated by switching module 202. In the same or alternative embodiments, the desired output characteristic may comprise an amplitude of the alternating current generated by switching module 202. In the same or alternative embodiments, the desired output characteristic may comprise a frequency of a voltage of the alternating current generated by switching module 202.

Figure 3A:
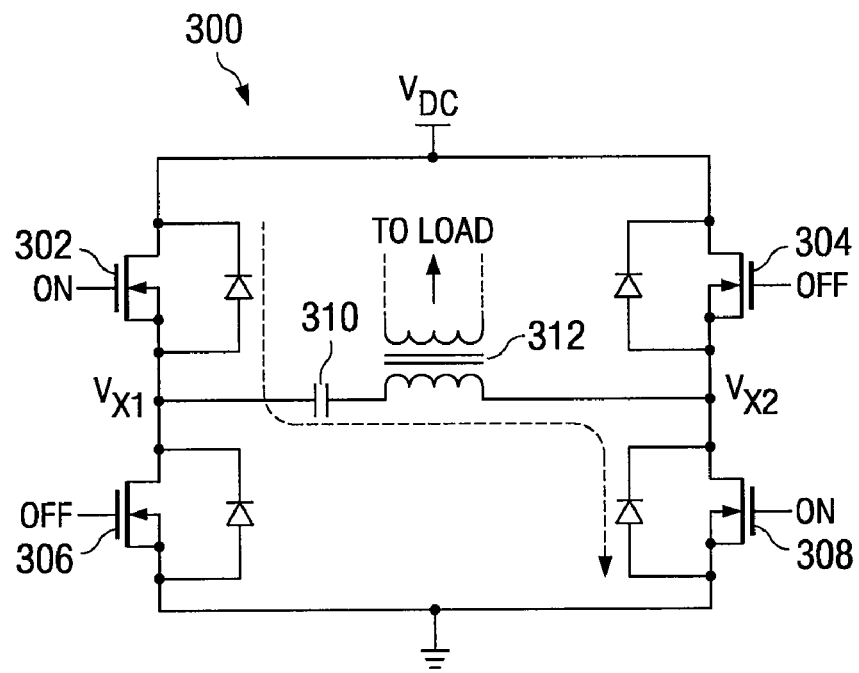
FIGS. 3A-3D illustrate an example circuit diagram for a full bridge inverter, in accordance with the teachings of the present disclosure.
Figure 3B:
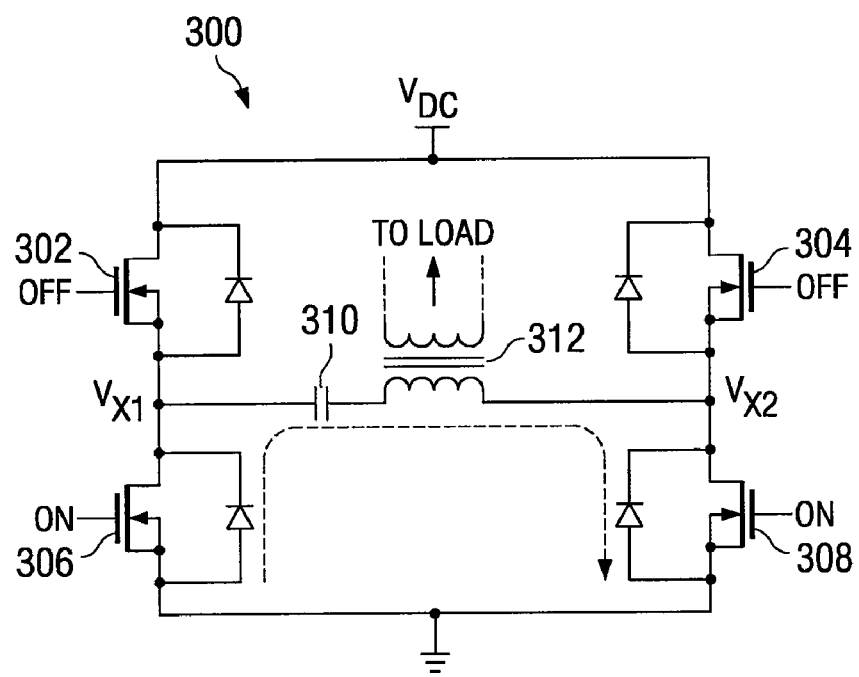
Figure 3C:
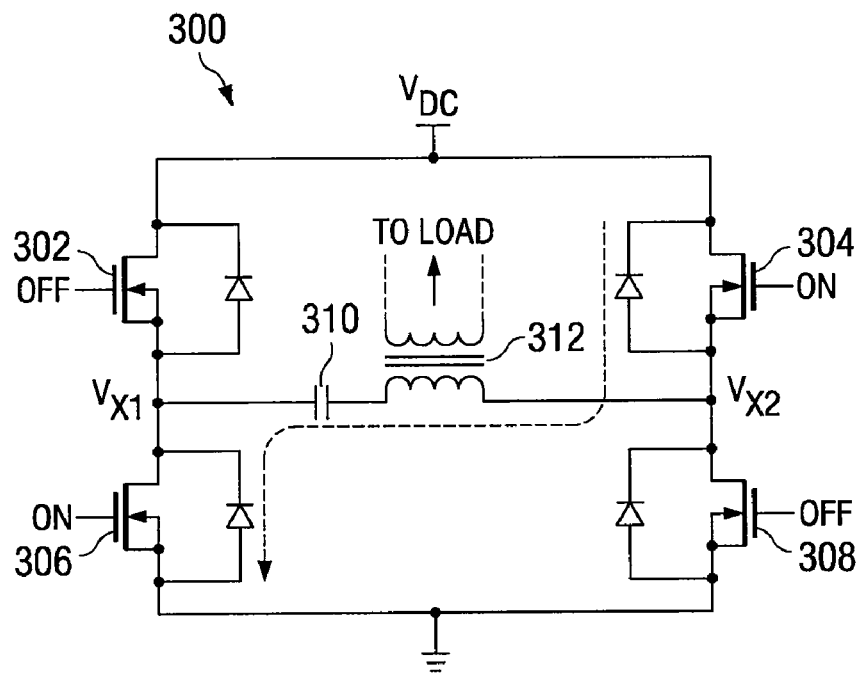
Figure 3D:
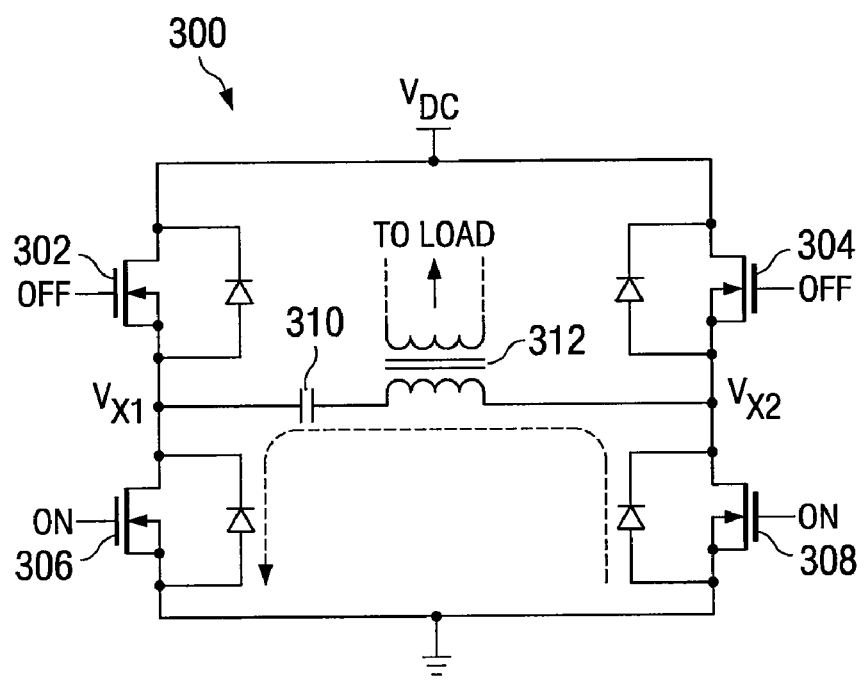

FIGS. 3A-3D illustrate an example circuit diagram of a full bridge inverter 300, in accordance with the teachings of the present disclosure. In particular, each of FIGS. 3A-3D depicts full bridge inverter 300 at a particular instant during a switching cycle of full bridge inverter 300. As discussed above, certain embodiments of switching module 202 may comprise full bridge inverter 300. As depicted in FIGS. 3A-3D, full bridge inverter 300 may comprise four n-channel power MOSFETs 302, 304, 306, and 308, a DC blocking capacitor 310, and a transformer 312. In operation, MOSFETs 302-308 may be appropriately switched on and off so as to generate an AC voltage to a load coupled to transformer 312. For example, at the beginning of a switching cycle as shown in FIG. 3A, MOSFETs 302 and 308 may be on. Accordingly, a primary current (as indicated by the dashed arrow) may flow through MOSFET 302, DC blocking capacitor 310, the primary side of transformer 312, and MOSFET 308. During this interval, the primary current may ramp up until control module 206 turns MOSFET 302 off. When MOSFET 302 turns off, the primary current may forward bias the body diode of MOSFET 306 which may clamp voltage present at node $V_{x1}$ just below ground as shown in FIG. 3B. Control module 206 may then turn on MOSFET 306, at which point its drain-to-source voltage may be near zero because its forward-biased body diode may clamp the drain. Because MOSFET 308 is still on, the primary current may flow through MOSFET 306, capacitor 310, the primary side of transformer 312, and MOSFET 308. Control module 206 may then turn off MOSFET 308. Remaining energy in transformer 312 may charge up a voltage at node $V_{x2}$ until the body diode of MOSFET 304 is forward biased. Accordingly, when MOSFET 304 turns on, it may do so with near-zero drain-to-source voltage. Consequently, the primary current reverses polarity as shown in FIG. 3C, beginning a new cycle with the current flowing in the opposite direction, with MOSFET 304 and MOSFET 306 on. The primary current may ramp up until control module 206 turns off MOSFET 304. When MOSFET 304 is turned off, the primary current may forward bias the body diode of MOSFET 308, which may clamp the voltage at node $V_{x2}$ just below ground as shown in FIG. 3D. The controller may then turn on MOSFET 308 and turn off MOSFET 306, beginning a new cycle as shown in FIG. 3A.

In embodiments where switching module 202 comprises full bridge inverter 300, the frequency at which MOSFETs 302-308 are turned on and off may control the frequency of the voltage and/or current generated by switching module 202. Similarly, the amplitudes of the voltage and/or current generated by switching module may be controlled by the frequency at which MOSFETs 302-308 are turned on, as well as the length of time the switches remain "on" during switching. Accordingly, in such embodiments, control module 206 may, based on a power factor sensed by sensing module 204, appropriately control switching module 202 to generate an alternating current waveform with desired voltage frequency, voltage amplitude, current frequency, and/or current amplitude.

Figure 4:
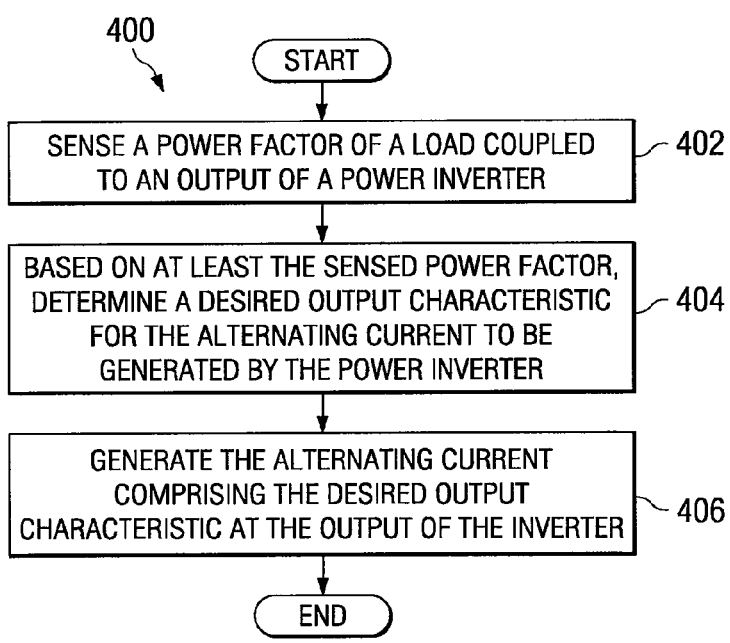
FIG. 4 illustrates a flow chart of an example method for controlling a power inverter, in accordance with teachings of the present disclosure.

FIG. 4 illustrates a flow chart of an example method 400 for controlling a power inverter, in accordance with teachings of the present disclosure. In some embodiments, method 400 includes sensing a power factor of a load coupled to the output of a power inverter and generating an alternating current comprising a desired output characteristic based at least upon the sensed power factor.

According to one embodiment, method 400 preferably begins at step 402. Teachings of the present disclosure may be implemented in a variety of configurations of information handling system 100. As such, the preferred initialization point for method 400 and the order and identity of the steps 402-406 comprising method 400 may depend on the implementation chosen.

At step 402, sensing module 204 or another component and/or information handling system 100 may sense a power factor of a load coupled to an output of power inverter 108. In some embodiments, the power factor may be indicative of the capacitance of the load coupled to the output of power inverter 108. For example, the load may comprise a capacitance associated with an illumination device (e.g., CCFL 112) coupled to the output of power inverter 108.

At step 404, based on at least the sensed power factor, control module 206 and/or another component of information handling system 100 may determine a desired output characteristic for an alternating current to be generated by power inverter 108. For example, as mentioned above, the sensed power factor may be indicative of a capacitance associated with the load coupled to the output of power inverter 108, and control module 206 may determine the appropriate voltage frequency, voltage amplitude, current frequency, and/or current amplitude of the alternating current to be generated by power inverter 108.

At step 406, power inverter 108 may generate an alternating current comprising the desired output characteristic at the output of power inverter 108. For example, in implementations in which power inverter 108 comprises full bridge inverter 300, control signals communicated from control module 206 to switching module 202 may switch MOSFETs 302-308 on and off in a manner appropriate to generate an alternating current with the desired output characteristics (e.g., desired voltage frequency, desired voltage amplitude, desired current frequency, and/or desired current amplitude).

Although FIG. 4 discloses a particular number of steps to be taken with respect to method 400, it is understood that method 400 may be executed with greater or lesser steps than those depicted in FIG. 4. Method 400 may be implemented using information handling system 100 or any other system operable to implement method 400. In certain embodiments, method 400 may be implemented partially or fully in software embodied in tangible computer readable media. As used in this disclosure, "tangible computer readable media" means any instrumentality, or aggregation of instrumentalities that may retain data and/or instructions for a period of time. Tangible computer readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or storage.

The methods and systems described herein may provide advantages over traditional approaches of power inverter design in portable computers which often require development of power inverters that must be tuned effectively to different CCFL sizes and manufacturers. In accordance with the present disclosure, the systems and methods disclosed herein may be technically advantageous because they may provide for a "universal" power inverter that may be adapted for a plurality of loads.

Although the present disclosure has been described in detail, it should be understood that various changes, substitutions, and alterations can be made hereto without departing from the spirit and the scope of the invention as defined by the appended claims.

What is claimed is:

1. A method of controlling a power inverter, comprising:
sensing a power factor of a capacitance associated with a cold cathode fluorescent lamp (CCFL) coupled to an output of a power inverter;
based on at least the sensed power factor, determining at least one desired output characteristic for an alternating current to be generated by the power inverter, wherein the at least one desired output characteristic comprises at least one of: (a) an amplitude of a voltage of the alternating current, (b) a frequency of the voltage of the alternating current, and (c) a peak amplitude of the alternating current; and
generating the alternating current comprising the desired output characteristic at the output of the power inverter.

2. A method according to claim 1, wherein the power inverter comprises a full bridge inverter.

3. A system for converting a direct current into an alternating current comprising:
a switching module having an input and an output, the switching module operable to receive a direct current at the input and to generate at the output a corresponding alternating current having at least one desired output characteristic, wherein the at least one desired output characteristic comprises at least one of: (a) an amplitude of a voltage of the alternating current, (b) a frequency of the voltage of the alternating current, and (c) a peak amplitude of the alternating current;
a sensing module coupled to the switching module output, the sensing module operable to sense a power factor associated with a capacitance associated with a cold cathode fluorescent lamp (CCFL) coupled to the switching module output; and
a control module coupled to the power inverter and the sensing module, the control module operable to control the desired output characteristic based at least on the sensed power factor.

4. A system according to claim 3, wherein the switching module comprises a full bridge inverter.

5. An information handling system comprising:
a processor;
a memory communicatively coupled to the processor;
a display device coupled to the processor, the display device including a cold cathode fluorescent lamp (CCFL) that illuminates the display device; and
a power inverter coupled to the CCFL, the power inverter providing an alternating current to the CCFL, wherein an output characteristic of the alternating current is based at least on a power factor associated with the a capacitance of the CCFL, and, wherein the at least one desired output characteristic comprises at least one of:
(a) an amplitude of a voltage of the alternating current,
(b) a frequency of the voltage of the alternating current,
and (c) a peak amplitude of the alternating current.

6. An information handling system according to claim 5, the power inverter comprising:
   a switching module having an input and an output, the switching module operable to receive a direct current at the input and to generate at the output a corresponding alternating current with the desired output characteristic;
   a sensing module coupled to the switching module output, the sensing module operable to sense the power factor; and
   a control module coupled to the power inverter and the sensing module, the control module operable to control the desired output characteristic based at least on the sensed power factor.

7. An information handling system according to claim 6, further comprising a direct current power source coupled to the input of the power inverter.

8. An information handling system according to claim 6, wherein the switching module comprises a full bridge inverter.

* * * * *